United States Patent [19]
Higgins

[11] 3,775,088
[45] *Nov. 27, 1973

[54] PROCESS FOR TREATING FERTILIZER PLANT WASTE STREAMS

[75] Inventor: Irwin R. Higgins, Oak Ridge, Tenn.

[73] Assignee: Small Business Investment Company of New York, Inc.

[ * ] Notice: The portion of the term of this patent subsequent to May 18, 1988, has been disclaimed.

[22] Filed: Feb. 28, 1972

[21] Appl. No.: 229,741

[52] U.S. Cl. ............................. 71/1, 71/39, 210/33, 423/396
[51] Int. Cl. ............................................ B01d 15/06
[58] Field of Search .................... 71/1, 59; 423/396; 210/37, 38, 33

[56] References Cited
UNITED STATES PATENTS

| | | | |
|---|---|---|---|
| 3,579,322 | 5/1971 | Higgins | 71/34 |
| 3,580,842 | 5/1971 | Higgins | 210/33 |
| 3,492,092 | 1/1970 | Higgins | 71/34 X |
| 3,475,330 | 10/1969 | Gilles | 210/38 X |
| 3,669,878 | 6/1972 | Marantz et al. | 210/38 |
| 3,420,773 | 1/1969 | Selmeczi | 210/37 X |
| 3,565,798 | 2/1971 | Barnes | 210/33 |
| 2,528,099 | 10/1950 | Wilcox et al. | 210/33 |
| 2,815,322 | 12/1957 | Higgins | 210/33 |

FOREIGN PATENTS OR APPLICATIONS 206,290  9/1956  Australia ............................. 210/33

Primary Examiner—Frank A. Spear, Jr.
Assistant Examiner—Richard Barnes
Attorney—John W. Malley et al.

[57] ABSTRACT

A continuous process for treating a fertilizer plant waste aqueous stream containing ammonium, hardness metal and nitrate values to recover an ammonium nitrate fertilizer and a demineralized and substantially nitrate-free aqueous stream for recycle includes initially removing the ammonium ion and hardness metal ion values from the fertilizer plant waste aqueous stream with a cation exchange resin bed and then contacting the essentially ammonium and hardness metal ion-free aqueous stream with an anion exchange resin bed to recover a second ammonium nitrate fertilizer stream and a demineralized and nitrate-free aqueous stream.

8 Claims, 1 Drawing Figure

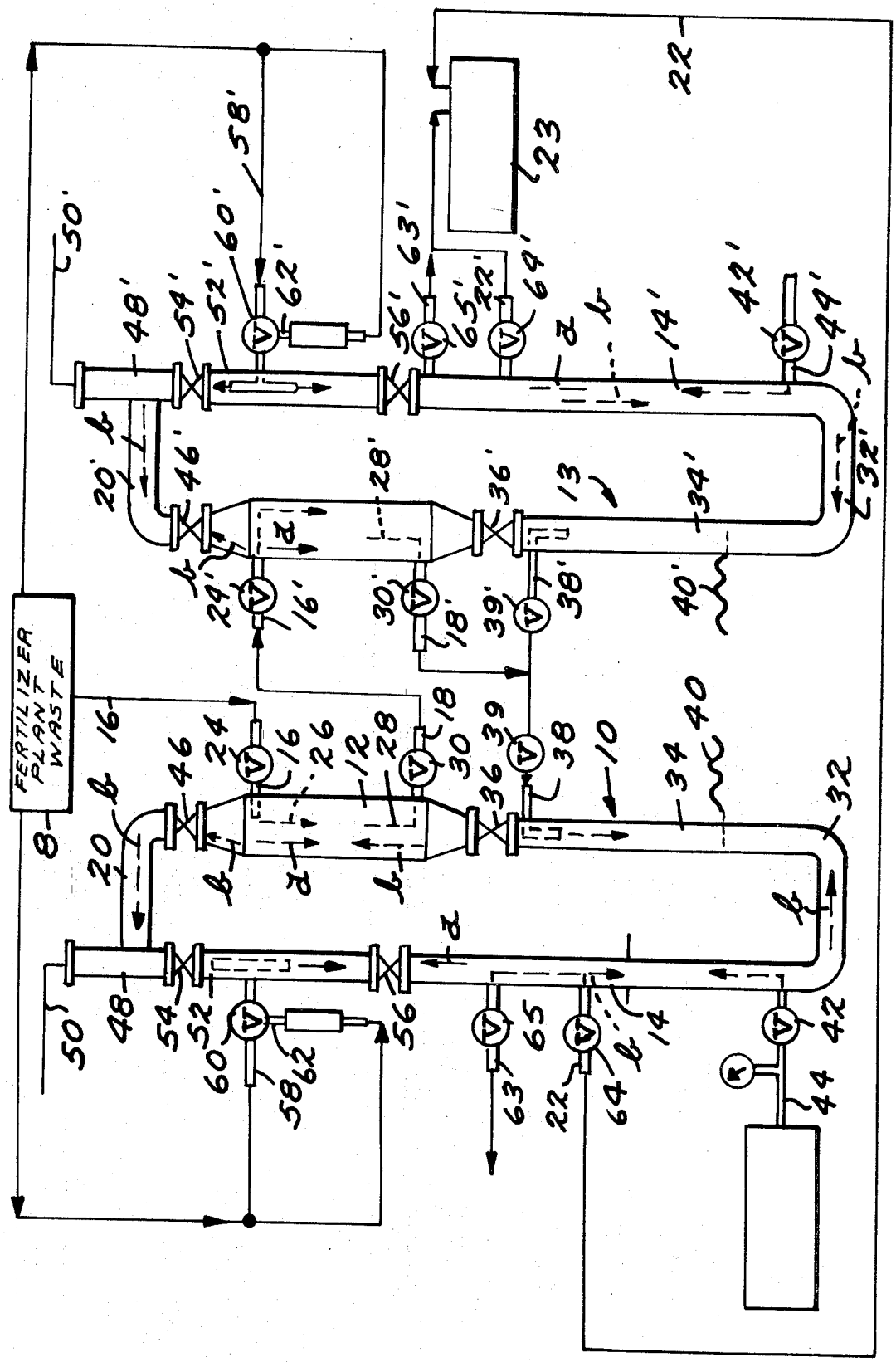

PROCESS FOR TREATING FERTILIZER PLANT WASTE STREAMS

This invention relates to a method of treating a fertilizer plant waste stream containing ammonia and nitrate values to recover the same as fertilizer product and concomitantly to condition the stream so that it can, advantageously be employed as a recycle stream.

The invention relates specifically to a process for the production of ammonium nitrate fertilizer product from a fertilizer plant waste which heretofore has generally been discharged into lakes, streams, rivers and the like because a convenient and relatively economical method of treating the waste had not been devised. From an ecology view point, the introduction of these nitrogenous compounds into the receiving waters is quite unacceptable due to their toxic effects on humans and stream life. While prior attempts to solve the problem have involved such techniques as microbial nitrification and denitrification and ammonia stripping (air stripping at high pH levels) such methods were not entirely satisfactory. The present invention, however, provides an efficient method for recovering a commercially acceptable product from these wastes and to produce a demineralized water effluent which can be recycled to the system, thus not only substantially reducing or eliminating the discharge of the contaminants into receiving waters but also substantially reducing the amount of discharge per se.

GENERAL DESCRIPTION OF THE APPARATUS AND METHOD

The apparatus shown diagrammatically in the drawing comprises a cation exchange column loop system 10 in combination with an anion exchange column loop system 13 for recovering valuable fertilizer values from a fertilizer plant waste stream while simultaneously producing from the same waste stream process water suitable for recycle within the total system, thus providing an ideal overall operation from both an ecological and economical viewpoint.

The continuous cation exchange column loop system 10 has two operating ion exchange sections, i.e. a loading section 12 and a stripping section 14. The direction of liquid flow is indicated by the solid arrows $a$ and the direction of resin flow is indicated by the open arrows $b$. The loading section 12 is positioned adjacent the upper portion of one of the legs of the column loop and fertilizer plant waste enters through conduit 16 adjacent the upper portion of the loading section 12. This loading section contains a strong acid type cation exchange resin in the acid or salt form, and as the fertilizer plant waste stream flows downwardly therethrough the hydrogen ions of the ion exchange resin are exchanged into solution and the ammonium and metal ions such as calcium and magnesium are adsorbed on the resin. Thus, a softened product water is withdrawn from the lower portion or region of the loading section 12 through conduit 18 and is delivered to the anion exchange column loop system 13, as will be described in greater detail below, for further processing.

Thus, the ammonium and metal ion rich resin now in the loading section 12 is shifted upwardly around the upper loop end 20 and is passed downwardly to the stripping section 14. In stripping section 14 a nitric acid regenerating solution is passed upwardly through the bed of loaded resin, and the ammonium and metal ions loaded thereon are exchanged into solution with adsorption of hydrogen ions from the regenerating solution. Thus, an ammonium nitrate containing stream is removed from the stripping section 14 via conduit 22 and is delivered to ammonium nitrate product recovery station 23.

The aqueous stream leaving the loading section 12 of the cation exchange column loop system 10 via conduit 18 is characterized in that it has substantially reduced hardness and ammonia values. The stream is delivered, directly or indirectly via storage vessels, not shown, to the continuous anion exchange column loop system 13 which has two operating anion exchange sections, i.e. a loading section 12' and a stripping section 14'. Again, the direction of liquid flow is indicated by the solid arrow $a$ and the direction of resin flow is indicated by the open arrow $b$. As in the cation exchange column loop system 10, the aqueous stream in these sections of the anion exchange column loop system generally flows countercurrently to the movement of the resin.

The softened and reduced ammonia value aqueous stream from cation exchange column loop 10 is introduced into the loading section 12' via conduit 16'. The loading section 12' contains a weak base anion exchange resin and as the softened aqueous stream flows therethrough, the hydroxyl ions are exchanged into solution and the nitrate anions of the softened aqueous stream are absorbed on the resin. Thus, a substantially contaminating nitrate anion and cation free aqueous stream, i.e. a demineralized stream is taken off from the loading section 12' via conduit 18', said demineralized aqueous stream advantageously being recycled within the overall operation as a rinse medium for both the regenerated cation and anion resin via conduits 38 and 38'.

The contaminating nitrate anion rich resin now in the loading zone 12' is shifted to the stripping section 14'. In stripping section 14', a regenerating agent, an aqueous ammonia solution, is passed upwardly through the resin and the nitrate anions are exchanged into solution with absorption of hydroxyl ions. Thus, an ammonium nitrate containing stream is removed from the stripping section 14' via conduit 22' and is delivered to ammonium nitrate product recovery station 23.

In addition to the recovery of valuable ammonium nitrate fertilizer values from the fertilizer plant waste stream, which from an ecological viewpoint is a most advantageous feature of the present invention, another advantage of the present development is the production of a demineralized aqueous stream in the anion exchange column loop system 13 for recycle within the total system as a rinse medium for both the regenerated cation and anion exchange resin.

While the present system shown in the attached drawing illustrates one where the movement of the resin is generally counter-clockwise and the movement of the liquid flow is generally clockwise, the direction of each could obviously be reversed, if desired, in which case it may be advantageous to utilize a portion of the demineralized aqueous stream produced in the anion exchange column loop system 13 for pulsing, i.e. shifting the resin and providing backwash for both the cation and anion exchange resin in their respective column loops.

Description of the Apparatus And Method Of The Cation Exchange Unit For Reducing Substantially the Hardness Value Of The Fertilizer Plant Waste Stream And For Recovering Ammonium Nitrate Values Therefrom As shown in the drawing an aqueous fertilizer plant waste stream enters cation exchange column loop 10 from a source such as a tank 8 through conduit 16 controlled by valve 24 and distributor means 26. The distributor means 26 is located at the upper end of the loading section 12 which, in turn, is located adjacent the top or upper portion of the cation exchange column loop 10. The aqueous fertilizer plant waste stream flows downwardly through the cation exchange resin bed contained in loading section 12 and on which is absorbed the ammonia and hardness metal values thereof. Softened water passes out of this section through collecting means 28 and pipe 18 provided with valve 30.

The continuous cation exchange column loop 10 includes the loading section 12 which is arranged to permit upward flow of cation resin therein and stripping section 14 arranged for downward flow of cation resin therein. The lower loop section 32 extends from the stripped cation resin discharge end of the stripping section 14 up to the cation resin rinse section 34 which, in turn, communicates with the cation resin inlet end of the loading section 12. Cation resin rinse section 34 is provided with resin valve 36 which controls the delivery of freshly stripped and rinsed cation resin into the loading section 12. Immediately subjacent the resin valve 36 in cation resin rinse section 34 is rinse water inlet 38 which leads from demineralized water outlet 18' positioned near the lower portion of the loading section 12' of the anion exchange column loop 13. Cation resin rinse section 34 is also provided at a point remote from the rinse water inlet 38 with a conductivity probe 40 which is responsive to changes in the conductivity of the solution in the cation exchange column loop 10 at its location. The conductivity probe 40 can be arranged with an appropriate servo-mechanism, such as a solenoid valve (not shown) to actuate valve 39 in the resin rinse line 38 should the regenerating agent/water interface which forms a definite boundry rise above the conductivity probe 40.

The upper end of the loading section 12, i.e. the loaded cation resin outlet end thereof, is connected to one end of the upper loop end 20 via resin valve 46. The other end of the upper loop end 20 is connected to reservoir 48 which is provided at one end thereof with overflow means 50 for backwash and pulse waters as well as cation resin fines, which means can lead to a disposal unit or cation resin fines recovery system (not shown).

The other end of reservoir 48 is connected to the upper zone of pulse section 52 through resin valve 54. The lower zone of pulse section 52 is connected to the loaded cation resin inlet end of stripping section 14 via resin valve 56. Intermediate the upper and lower zones of pulse section 52 and preferably near the top of section 52 is pulse water inlet conduit 58 controlled by two-way valve 60 which also controls delivery of backwash water to the pulse section 52 via conduit 62. Because the present system is arranged to deliver initially a new supply of ammonia and hardness metal ion loaded cation resin into the upper portion of the stripping or regeneration section 14, as opposed to the pulsing of freshly regenerated cation resin into a loading section, the pulse water and backwash water need not be a high quality water such as the demineralized water produced in the anion exchange column loop 13, so thatt even the fertilizer plant waste aqueous stream from tank 8 can be used for these purposes, if desired, thus effecting even greater economies in the overall system.

Adjacent the upper end of stripping section 14, i.e. the loaded cation resin inlet end is slip water removal line 63 controlled by valve 65 for removal of slip water at a point between resin valve 56 and stripping section 14. The slip water removed can be delivered to the said disposal unit or cation resin fines recovery system, or alternatively, it can be utilized as make-up water in the production of the aqueous nitric acid regenerating agent. Stripping section 14, also near the upper end thereof is provided with conduit 22 controlled by valve 64 which permits removal of ammonium nitrate-hardness metal nitrate solution from the column loop 10. Remotely positioned from conduit 22 in stripping section 14 and preferably immediately above the stripped cation resin outlet end thereof is regenerating agent inlet conduit 44 controlled by valve 42 through which regenerating agent flows upwardly through the loaded cation resin confined in stripping section 14.

In operation of the cation exchange column loop 10 during the loading and stripping cycle when aqueous nitric acid regenerating agent is flowing upwardly through the stripping section 14 and a separate portion of the cation exchange resin is being loaded with ammonium and hardness metal ions such as calcium and magnesium ions or even iron ions, from the fertilizer plant waste aqueous stream in loading section 12, resin valves 36, 46 and 56 are closed and resin valve 54 is open. Valves 42 and 64 in lines 44 and 56, respectively, are opened, permitting regenerating agent flow upwardly through the ammonium and hardness metal ion loaded bed in the stripping section 14 and removal of ammonium nitrate-hardness metal nitrate solution from the cation exchange column loop 10. Valve 24 in line 16 is opened to permit introduction of fertilizer plant waste aqueous stream into the loading section 12 for downward flow through fresh resin therein while valve 30 is opened for removal of softened product water from the column loop 10 for delivery to the anion exchange column loop system 13. Valves 65 (line 63), 39 (line 38) and 60 (lines 58 and 62), may be opened or closed depending on the conductivity signal.

After a predetermined time of passage of cation resin regenerating agent through the stripping section 14, the cation exchange column loop 10 is operated so as to shift and replace the cation exchange resin bed contained therein by introducing a fresh portion of ammonium and hardness metal ion loaded resin. Valves 36, 46 and 56 are automatically opened and valve 54 is closed. A hydraulic pulse is applied to the pulsing chamber 52 by introducing pulse water thereto via line 58 with valve 60 in the open position. The pulse water fluidizes the cation resin which moves around the loop. Thus fresh cation resin is introduced into the bottom of the loading section 12 via open valve 36 while at the same time an essentially corresponding volume of cation resin is withdrawn from the top of the loading section 12 and enters the cation resin reservoir 48. Essentially simultaneously, cation resin in the pulse section 52 is released through open valve 56 and enters the top portion of the cation resin regenerating section 14. Also essentially simultaneously, freshly stripped cation resin adjacent the bottom portion of cation resin regenerating section 14 is released and enters the cation resin rinse section 34. The regenerated and rinsed cation resin displaced from the rinse section 34 is that cation resin which moves into the bottom of the loading section 12 through open valve 36.

At the end of the pulse cycle, valve 54 is opened and deposits a supply of ammonium ion and hardness metal ion loaded cation resin into the pulse section 52 and valves 24, 30, 42, 64 and 38 are again opened to repeat the loading-regeneration cycle.

As stated above valve 38 is controlled by the conductivity probe or monitor 40 to provide a water to regenerating agent interface, thus assuring that only fresh, regenerated, substantially regenerating agent-free cation resin is pulsed into the lower portion of the loading zone 12 during the next pulsing cycle.

Description of the Apparatus and Method of the Anion Exchange Unit for Removing Substantially the Nitrate Anions from the Fertilizer Plant Waste Stream and for Recovering Ammonium Nitrate Values As seen in the drawing, the softened, nitrate anion containing stream leaving line 18 of the cation exchange column loop 10 is conducted to the anion exchange column loop 13. While the schematic illustration shows this stream being passed directly to the anion exchanger, it is obvious that it can also be passed thereto indirectly as by way of a storage vessel. The softened, nitrate anion containing stream enters the anion exchange column loop 13 through conduit 16' controlled by valve 24' and distributor means 26' which is located at the upper end of the loading section 12', which in turn, is located adjacent the top or upper portion of the anion exchange column loop 13. The softened, nitrate anion containing stream flows downwardly through the anion exchange resin bed contained in loading section 12' and on which is absorbed the nitrate valves thereof. A demineralized, essentially nitrate-free water passes out of this section through collecting means 28' and pipe 18' provided with valve 30'.

The continuous anion exchange column loop 13 includes the loading section 12' which, like its counterpart in the cation exchange column loop 10, is arranged to permit upward flow of anion resin therein and stripping section 14' arranged for downward flow of anion resin therein. The lower loop section 32' extends from the stripped anion resin discharge end of the stripping section 14' up to the anion resin rinse section 34' which, in turn, communicates with the anion resin inlet end of the loading section 12'. Anion resin rinse section 34' is provided with resin valve 36' which controls the delivery of freshly stripped and rinsed anion resin into the loading section 12'. Immediately subjacent the resin valve 36' in anion resin rinse section 34' is resin rinse water inlet 38', controlled by valve 39' which leads from demineralized water outlet 18' positioned near the lower portion of the loading section 12'. Anion resin rinse section 34' is also provided at a point remote from the rinse water inlet 38' with a conductivity probe 40' which is responsive to the change in the conductivity of the solution in the anion exchange column loop 13 at its location. The conductivity probe 40' can be arranged with an appropriate servo-mechanism, such as a solenoid valve (not shown) to actuate valve 39' in the resin rinse line 38' should the regenerating-/water interface which forms a definite boundary rise above the conductivity probe 40'.

The upper end of the loading section 12', i.e. the loaded anion resin outlet end thereof, is connected to one end of the upper loop end 20' via resin valve 46'. The other end of the upper loop end 20' is connected to reservoir 48' which is provided at one end thereof with overflow means 50' for backwash and pulse waters as well as anion resin fines, which means can lead to a disposal unit or an anion resin fines recovery system.

The other end of reservoir 48' is connected to the upper zone of pulse section 52' through resin valve 54'. The lower zone of the pulse section 52' is connected to the loaded anion resin inlet end of stripping section 14' via resin valve 56'. Intermediate the upper and lower zones of the pulse section 52' and preferably near the top of section 52' is pulse water inlet conduit 58' controlled by two-way valve 60' which also controls delivery of backwash water to the pulse section 52' via conduit 62'. Since the present system is arranged to deliver, initially, a new supply of nitrate ion loaded anion resin into the upper portion of the stripping or regeneration section 14', as opposed to pulsing freshly regenerated anion resin into a loading section, the pulse water and backwash water need not be a high quality water, so that even the fertilizer plant waste aqueous stream from tank 8 can be used for this purpose.

Adjacent the upper end of stripping section 14', i.e. the loaded anion resin inlet end is slip water removal line 63' controlled by valve 65' for removal of slip water at a point between resin valve 56' and stripping section 14'. The slip water removed can be delivered to the said disposal unit or anion resin fines recovery system, or alternatively, it can be utilized as make-up water in the production of the aqueous ammonia regenerating agent. Stripping section 14', also near the upper end thereof is provided with conduit 22' controlled by valve 64' which permits removal of softened ammonium nitrate-solution from the column loop 13. Remotely positioned from conduit 22' in stripping section 14' and preferably immediately above the stripped anion resin outlet end thereof is regenerating agent inlet conduit 44' controlled by valve 42' through which regenerating agent flows upwardly through the loaded anion resin confined in stripping section 14'.

The operation of the anion exchange column loop 13 is essentially the same as that of the cation exchange column loop 10 described in detail above. Thus, the flow and movement of the resin about the anion exchange column loop is effected in the same manner using the pulse line 58', its counterpart in the cation exchange column loop 10 being pulse line 58. The sequence of resin valve opening and closing is also essentially the same, the resin valves 36', 46', 45' and 56' of the anion exchange column loop 13 having as their counterpart in cation exchange column loop 10, resin valves 36, 46, 54 and 56, respectively. Rinse line 38', controlled by valve 39' is operated in anion exchange column loop 13 in much the same way as rinse line 38, controlled by valve 39 in the cation exchange column loop 10. Delivery to and from each of the ion exchange column loops of the liquid to be treated is essentially the same as is the introduction and removal of resin regenerating agent and stripping zone effluent.

DISCUSSION OF A SPECIFIC EMBODIMENT OF THE INVENTION

As one specific embodiment of the invention and with reference to the drawing, this system can conveniently be operated to treat a fertilizer plant waste stream typically containing the following constituents:

$NH_3$, 340 ppm; Mg, 4.8 ppm; Ca, 60 ppm; $NO_3$, 1240 ppm; Cl, 53 ppm; $SO_4$, 72 ppm; $SiO_2$, 15 ppm; urea, 27 ppm (average).

The cation exchange column loop 10 is operated for a 13.5 hour period during which time 4792 gallons of fertilizer plant waste feed were treated. This yielded a decationized water containing less than 5 ppm $NH_3$ and an ammonium nitrate (AN) product of 91 gallons with an average AN concentration of 0.81 lbs per gallon. The following operating conditions prevailed: run time, 2.25 minutes; pulse time, 10 seconds; pulse length, 13 inches; resin rate, 1.33 cu.ft./hr; feed rate, 6.15 gal/min; flow, 31.4 $gpm/ft^2$ and resin - Dowex HCR-W, having a size ranging from 16–100 standard mesh; aqueous nitric acid regenerating agent having a concentration in the range of 15–35 percent by weight.

The anion exchange column loop 13 was operated for a total of 16.5 hours to treat 4,300 gallons of decationized stream from the cation exchange column loop 10 to yield a demineralized, essentially nitrate free water containing less than 5 ppm $NH_3$ and an ammonium nitrate (AN) product of 111 gallons with an AN concentration of 0.495 lb/gal. The following operating conditions prevailed: run time, 2.25 minutes; pulse time, 10 seconds; pulse length, 14 inches; resin rate, 1443 cu.ft./hr; feed rate, 4.5 gal/min; flow, 23 $gpm/ft^2$ and resin, IRA–93 having a size ranging from 16–100 standard mesh, weak base. The regenerant was a 4–25 percent by weight aqueous ammonia solution.

The ammonium nitrate fertilizer solution produced from both the cation and anion exchange columns has a concentration in the range of 15–25 percent solids by weight and in the product tank receiving the same, the excess acid contained therein is neutralized with ammonium hydroxide.

Prior to introducing the fertilizer plant waste aqueous stream into the cation exchange column loop 10, preferably this stream is passed through one or more filters to remove particulate matter and urea.

Further, prior to recycling the demineralized aqueous stream from the anion exchange column loop to both the cation exchange column loop and the anion exchange column loop as cation resin rinse medium and anion resin rinse medium, respectively, which demineralized aqueous stream can alos be recycled to the principal ammonium nitrate production system for use in the cooling towers, this said demineralized aqueous stream can be introduced into a second bed of an anion exchange resin bed, fixed or otherwise, and preferably a strong base anion exchange resin to remove silica values therefrom. Thereafter, this second bed of anion exchange resin can be regenerated using sodium hydroxide as the regenerating agent with the effluent being directed to a waste stream.

Additionally, the demineralized and essentially silica free aqueous stream produced in the second anion exchange resin bed can be recycled to the main fertilizer plant producing ammonium nitrate as boiler feed water or cooling tower water.

The diameter of the loading zone as well as the diameter of the stripping section of each column loop can be varied. Generally, the diameter of the loading zone will be at least about 12 inches in order to achieve an economical as well as efficient treatment of the fertilizer plant waste aqueous stream. The columns, preferably, are constructed of mild steel and the sections thereof can be belled to 12 inch diameter butterfly valves and 12 inch elbows.

It will be understood from the foregoing description that this invention is not limited to practice according to the specific embodiment illustrated and described herein, and that variations thereof can be made while not departing from the principles involved.

What is claimed is:

1. A continuous process for producing an ammonium nitrate containing fertilizer material from a fertilizer plant waste aqueous stream containing contaminating cations comprising ammonium and hardness metal ions and contaminating anions comprising nitrate ions, the steps comprising
   1. introducing said fertilizer plant waste aqueous stream into the upper portion of a first section of a cation exchange column loop having a shiftable cation exchange resin bed therein and causing said waste aqueous stream to flow downwardly through said cation resin bed to transfer the ammonium and hardness metal ions from the waste aqueous stream to said cation resin, said first section of the cation exchange column loop being positioned adjacent the upper end of said cation exchange column loop; while
   2. withdrawing from the lower portion of said first section of the cation exchange column loop a softened aqueous stream having substantially reduced amounts of ammonium ion values and having nitrate anion values;
   3. introducing an aqueous nitric acid regenerating agent into the lower portion of a second section of said cation exchange column loop containing cation resin loaded with ammonium and hardness metal values from (1) and causing said regenerating agent to flow upwardly through said loaded cation resin;
   4. withdrawing from the upper portion of said second section of said cation exchange column loop an ammonium nitrate containing stream;
   5. interrupting the flow of fertilizer plant waste aqueous stream in (1) and the flow of nitric acid regenerating agent in (3) to the respective first and second sections of said cation exchange column loop;
   6. introducing cation-exchange resin pulse medium into a cation exchange resin pulse section intermediate the inlet and outlet thereof, the outlet of said cation exchange resin pulse section communicating with the upper portion of said second section of said cation exchange column loop and the inlet of said cation exchange resin pulse section communicating with the upper portion of said first section whereby the cation resin bed in said cation exchange column loop is shifted from one section thereof to another contiguous section therein, thereby introducing into the upper portion of the second section cation resin from said cation exchange resin pulse section which carries the ammonium and hardness metal values previously eliminated from the fertilizer plant waste aqueous stream for regeneration thereof, whereby in turn at least a part of said cation resin in the lower part of said second section is displaced therefrom, thereby causing the introduction into the lower portion of said first section cation resin which has previously been regenerated in said second section, whereby, in turn, at least a part of said cation resin in the upper portion of said first section is displaced therefrom;

7. detecting the presence of aqueous nitric acid regenerating agent in the cation resin bed being pulsed between the lower portion of said second section and the lower portion of said first section and in response thereto introducing cation exchange resin rinse medium into said cation exchange column loop intermediate said first and second sections in a direction countercurrent to the movement of said cation exchange resin bed, thereby establishing the introduction of substantially aqueous nitric acid regenerating agentfree cation exchange resin into the lower portion of said first section;

8. introducing said withdrawn softened aqueous stream having substantially reduced amounts of ammonium ion values and having nitrate anion values from step (2) into the upper portion of a first section of an anion exchange column loop having a shiftable anion exchange resin bed therein and causing said softened aqueous stream to flow downwardly through said anion resin bed to transfer the nitrate ions from the softened aqueous stream to said anion resin, said first section of the anion exchange column loop being positioned adjacent the upper end of said anion exchange column loop; while 9. withdrawing from the lower portion of siad first section of the anion exchange column loop a demineralized and substantially nitrate-free aqueous stream; 10. introducing an aqueous ammonia regenerating agent into the lower portion of a second section of said anion exchange column loop containing anion resin loaded with nitrate values from (8) and causing said regenerating agent to flow upwardly through said loaded anion resin;

11. withdrawing from the upper portion of said second section of said anion exchange column loop an ammonium nitrate containing stream;

12. interrupting the flow of softened aqueous stream in (8) and the flow of aqueous ammonia regenerating agent in (10) to the respective first and second sections of said anion exchange column loop;

13. introducing anion exchange resin pulse medium into an anion exchange resin pulse section intermediate the inlet and outlet thereof, the outlet of said anion exchange resin pulse section communicating with the upper portion of said second section of said anion exchange column loop and the inlet of said anion exchange resin pulse section communicating with the upper portion of said first section whereby the anion resin bed in said anion exchange column loop is shifted from one section thereof to another contiguous section therein, thereby introducing into the upper portion of the second section anion resin from said anion exchange resin pulse section which carries the nitrate anion values previously eliminated from the softened aqueous stream for regeneration thereof, whereby in turn at least a part of said anion resin in the lower part of said second section is displaced therefrom, thereby causing the introduction into the lower portion of said first section anion resin which has previously been regenerated in said second section, whereby, in turn, at least a part of said anion resin in the upper portion of said first section is displaced therefrom; and 14. detecting the presence of aqueous ammonia regenerating agent in the anion resin bed being pulsed between the lower portion of said second section and the lower portion of said first section and in response thereto introducing anion exchange resin rinse medium into said anion exchange column loop intermediate said first and second sections in a direction countercurrent to the movement of said anion exchange resin bed, thereby establishing the introduction of substantially aqueous ammonia regenerating agent-free anion exchange resin into the lower portion of said first section; said cation exchange resin rinse medium introduced into said cation exchange column loop in step (7) and the anion exchange resin rinse medium introduced into said anion exchange column loop in step (14) being demineralized and substantially nitrate-free aqueous stream withdrawn from the lower portion of said first section of said anion exchange column loop in step (9).

2. The process of claim 1 wherein the introduction of said fertilizer plant waste aqueous stream in step (1), the introduction of aqueous nitric acid regenerating agent in step (3), the introduction of softened aqueous stream in step (8) and the introduction of aqueous ammonia regenerating agent in step (10) are all conducted during a first predetermined period of time and said shifting of said cation exchange resin bed in step (6) and said shifting of said anion exchange resin bed in step (13) are both carried out during a second predetermined period of time.

3. The process of claim 1 wherein the aqueous waste stream is flowed through filters to remove particulate matter and urea as a pre-step to the ion exchange steps.

4. The process of claim 1 wherein the substantially demineralized waste stream obtained from step (9) is recycled to other process steps in the ammonium nitrate production process.

5. The process of claim 1 wherein the substantially demineralized waste stream obtained in step (9) is flowed through anion exchange resin to remove residual silica values and thereafter is recycled to steam generating equipment in the ammonium nitrate production process as boiler feed water.

6. The process of claim 1 wherein the cation exchange resin is strong acid cation exchange resin.

7. The process of claim 1 wherein the anion exchange resin is a weak base anion exchange resin.

8. The process of claim 5 wherein the anion exchange resin is strong base anion exchange resin.

* * * * *